July 3, 1923.  1,460,803
E. A. PORTZER
ANTISKID CHAIN
Filed April 2, 1921
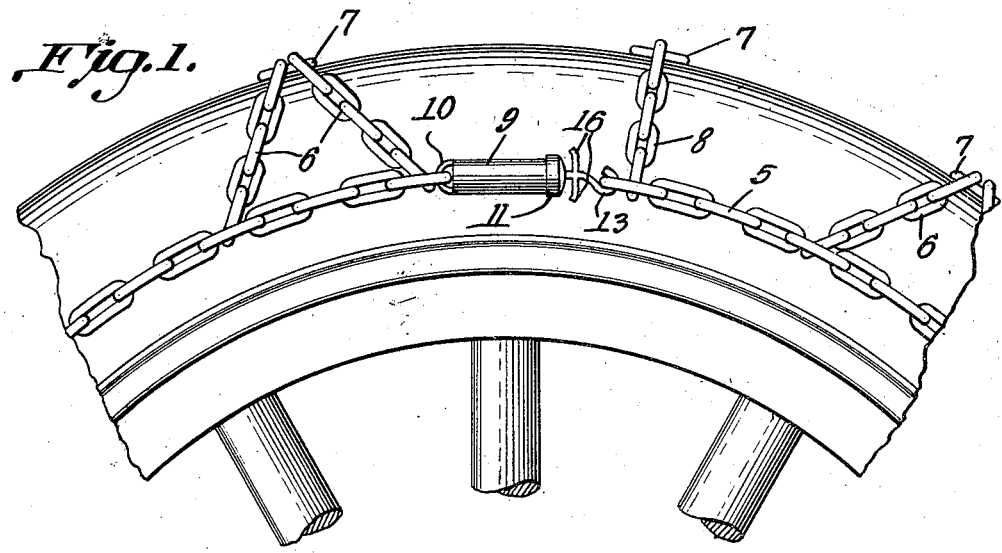
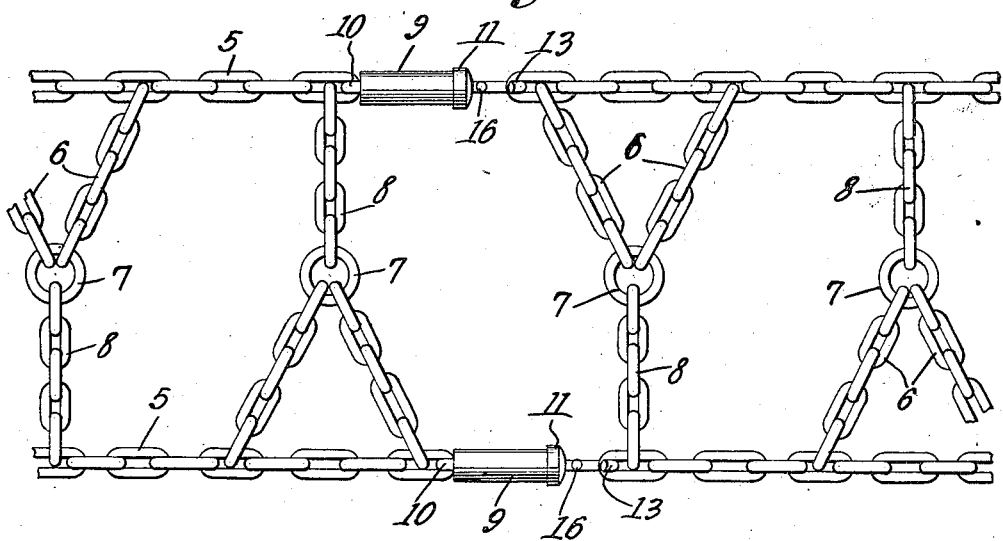
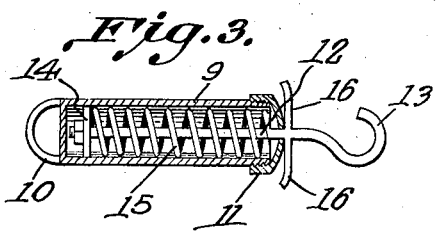
Inventor
Edward A. Portzer
By Norman T. Whitaker
his Attorney Patented July 3, 1923.

1,460,803

UNITED STATES PATENT OFFICE.

EDWARD A. PORTZER, OF ST. MARYS, PENNSYLVANIA.

ANTISKID CHAIN.

Application filed April 2, 1921. Serial No. 458,161.

*To all whom it may concern:*

Be it known that I, EDWARD A. PORTZER, a citizen of the United States, and a resident of St. Marys, in the county of Elk and State of Pennsylvania, have invented a new and useful Antiskid Chain, of which the following is a specification.

My invention relates to anti-skid chains for pneumatic tires and its principal object resides in the provision of a chain of this character which embodies novel cross or traction chains arranged in staggered relation and thereby presenting a maximum and evenly distributed anti-skid or traction surface.

A further object of the invention resides in the provision of an anti-skid chain including Y-shaped cross chains or traction elements arranged in staggered relation with respect to the longitudinal or side chains and thereby presenting a balanced traction surface at both sides of the tire as well as at the crest thereof.

It is also an object of the invention to provide an anti-skid chain embodying a novel spring actuated fastener for connecting the ends of the longitudinal elements of the anti-skid chain, and which is of such construction as to preclude water, dust and other foreign matter from the interior thereof.

With the preceding and other objects and advantages in mind, the invention consists in the novel combination of elements, construction and arrangement of parts and operations to be more fully described hereinafter, claimed and illustrated in the accompanying drawing, wherein:

Figure 1 is a side elevation of my improved anti-skid chain applied to a pneumatic tire;

Figure 2 is a top plan view of the chain; and

Figure 3 is a longitudinal sectional view of the fastener used in conjunction with the invention.

Referring in detail to the drawing wherein similar characters of reference designate similar parts throughout the several views, the numeral 5 designates a pair of parallel side chains or elements adapted to extend circumferentially of the tire, as shown in Figure 1.

Carried by the side chains 5 and arranged in staggered relation are pairs of relatively short chains 6 which extend to a point to overlie the crest of the tire, and are connected together by rings or traction elements 7 which are disposed at the crest of the tire. Connected with each of the rings or traction elements 7 and to one of the side chains 5 is a relatively short chain 8. As is illustrated in Figure 2, these chains 6, rings 7 and chains 8 constitute Y-shaped anti-skid or traction elements that are disposed in staggered relation with respect to the side chains.

In order to connect the free ends of the side chains 5 together, I have provided novel fastenings which include cylinders 9 carrying a loop 10 at one end having loose connection with the end links of the chains 5. A cap 11 is threaded upon the opposite end of each cylinder 9 and passing centrally through the cap 11 and longitudinally movable in the cylinder 9 is a shank 12 terminating in a hook 13 engageable with one link of the adjacent ends of the chains 5.

The shank 12 carries an abutment 14 at its inner end and disposed within the cylinder and encircling the shank and bearing against the abutment 14 and cap 11 is an expansible coil spring 15. In order to move the hook 13 longitudinally against the tension of the spring 15, the shank 12 is formed with oppositely extending finger engaging elements 16.

It is to be understood that the form of my invention herein shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

The combination with an anti-skid device including parallel side chains, of a cylinder carried by one end of each chain, a cap arranged upon one end thereof, a hook for engagement with the opposite end of each chain extending within each cylinder, a coil spring in each cylinder and normally urging said hooks toward the cylinder, and a finger engaging element carried by each hook, said element interposed between the hook and the cylinder and in the same plane as the hook, whereby said finger engaging element is moved against tension of the spring for the purpose of engaging or disengaging the hook from the chain.

EDWARD A. PORTZER.